United States Patent [19]

Cavazos

[11] Patent Number: 4,824,461
[45] Date of Patent: Apr. 25, 1989

[54] METHOD AND APPARATUS FOR MOLD COOLING

[76] Inventor: Guillermo Cavazos, M. De Cervantes No. 810, Col. Colinas De San Jeronimo, Mty., N.L., Mexico

[21] Appl. No.: 152,323

[22] Filed: Feb. 4, 1988

[51] Int. Cl.$^4$ .............................................. C03B 9/38
[52] U.S. Cl. ........................................ 65/83; 65/162; 65/319; 65/265; 65/326; 65/356
[58] Field of Search ................. 65/356, 162, 326, 319, 65/265, 83, 111

[56] References Cited

U.S. PATENT DOCUMENTS

| | | | |
|---|---|---|---|
| 3,285,728 | 11/1966 | Torok | 65/162 |
| 3,644,110 | 2/1972 | Sendt | 65/265 X |
| 4,578,104 | 3/1986 | Jones | 65/356 X |

FOREIGN PATENT DOCUMENTS 491846  9/1938  United Kingdom ................. 65/356

Primary Examiner—Arthur Kellogg
Attorney, Agent, or Firm—Solon B. Kemon

[57] ABSTRACT

A mold cooling arrangement includes a plurality of closed bores vertically disposed in the mold between the molding surface and the mold exterior. A manifold positioned vertically above the mold communicates with the interior of each bore and a condenser is disposed vertically above and communicates with the manifold. The bores and manifold are at least partially filled with a liquid such as distilled water which partially evaporized during operation of the mold and the vapor rinse to the condenser is converted back to liquid and return by gravity to the manifold and mold bores.

4 Claims, 2 Drawing Sheets

METHOD AND APPARATUS FOR MOLD COOLING

BACKGROUND OF THE INVENTION

Particularly in the glass molding industry, cooling of the molds in order to control the rate of solidification of the molten glass is a critical factor in determining the quality of the molded product and is integrally related to the speed of operation of the molding machine. Due to the difficulty in controlling liquid cooling in this environment, most of the industry has employed air cooling of the molds but this is very inefficient. In this case of multi cavity bottle molding machines, it requires very large blowers which when electrically driven employ motors in the range of 250 horsepower per machine. In order to increase the speed of operation of the molding machines, it has been considered desirable to utilize liquid cooling of the molds but prior art attempts in this direction have resulted in too rapid chilling of the molds and consequently poor quality molded products.

BRIEF SUMMARY OF THE INVENTION

Applicant has discovered that by employing a phase change liquid in a closed circuit somewhat analogous to a heat pipe, that not only can the operating speed of the machines be maximized consistent with good quality molded ware, but the useful life of the molds employed is greatly extended. Each mold in accordance with the invention is provided with a series of vertically arranged blind bores between the molding surface and the mold exterior. These bores are all communicated with a common manifold positioned vertically above the molds and the manifold in turn is connected to a condenser which is adjustably vented to the atmosphere. A phase change liquid such as distilled water is used to fill the bores and at least part of the manifold and this liquid is at least partially vaporized due to transfer of heat from the molten glass through the side wall of the mold. The vapor rises through the manifold and into the condenser above the manifold where the vapor condenses and falls by gravity back to the manifold and bores.

BRIEF DESCRIPTION OF THE DRAWING

FIG. 3 is a side elevation partially in section showing a bottle in a mold half with two of the blind bores shown in dotted line;

FIG. 4 is a top plan view of one half of the mold shown in FIG. 3; and

DETAILED DESCRIPTION

Figure 1:
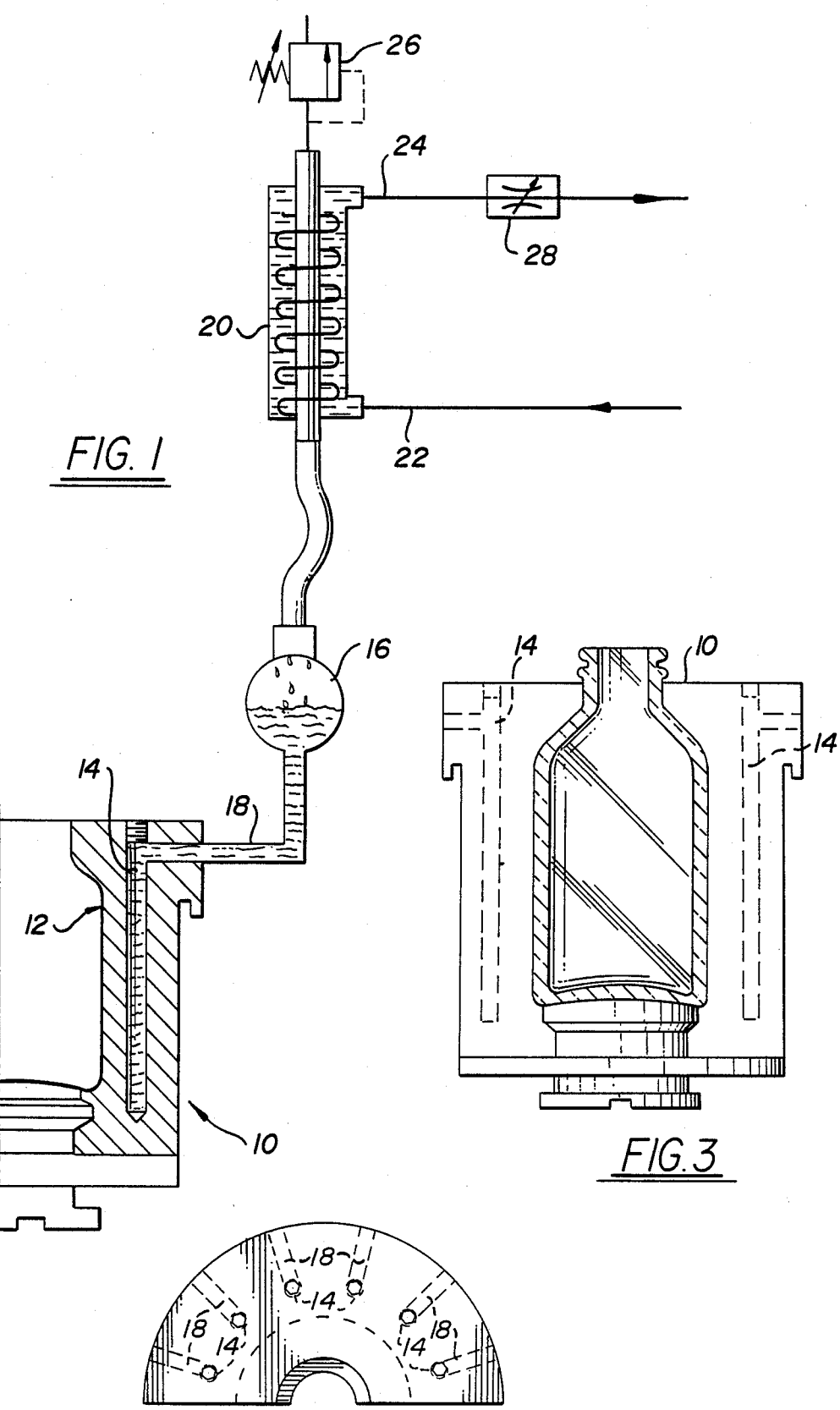
FIG. 1 is a diagrammatic illustration of the mold, the manifold, the condenser and the adjustable atmospheric vent.

Referring first to the diagrammatic showing of FIG. 1, which illustrates the heat transfer principles involved, the mold is indicated at 10 and a portion of the molding surface at 12. A blind bore 14 is formed vertically in the wall of the mold substantially mid-way between the molding surface 12 and the exterior of the mold proper. It will be understood that each mold half includes a plurality of such bores 14. Each bore 14 is communicated to a common manifold 16 by a connection 18 which extends through the side wall of the mold. The manifold 16 is positioned above the upper level of the mold and a condenser 20 is positioned vertically above the level of the manifold. Fluid connections 22 and 24 permit circulation of a coolant through the condenser 20 but out of fluid contact with the fluid contained in the cooling system. The upper end of the condenser 20 is vented to atmosphere through an adjustable valve 26. An adjustable flow restriction 28 may be placed in the line 24 to control the rate of circulation of coolant to the condenser 20.

In operation, heat transfer from the molten glass to the mold is effective to at least partially vaporize some of the liquid in the vertical bores 14. These vapors rise by thermal convection to the condenser 20 where they are at least partially condensed and the condensed droplets return by gravity to the manifold 16 and the bores 14. Thus, there is a closed system requiring no replacement of the mold cooling liquid as it is simply reused each time it undergoes a phase change. The rate of condensing is of course, adjustable by means of the variable flow device 28 and by controlling the temperature of the coolant circulated to the condenser 20 through the lines 22 and 24.

Figure 2:
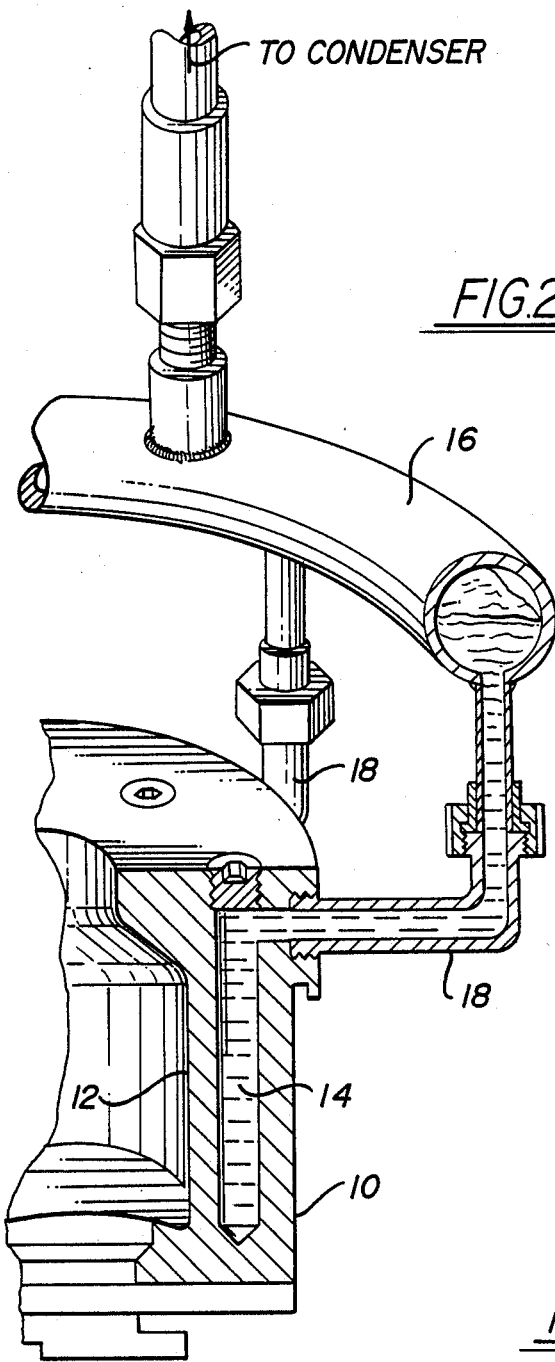
FIG. 2 is a partial sectional view of a portion of a mold together with a portion of the manifold and the condenser.

Referring now to FIG. 2, this is a more structural showing of the actual apparatus diagrammed in FIG. 1 and with the parts having corresponding reference numerals.

FIG. 3 merely shows a bottle in section positioned in the mold 10 with two of the blind bores 14 shown in dotted line.

FIG. 4 is a top plan view of the mold half of FIG. 3 showing the disposition of the bores 14.

Figure 5:
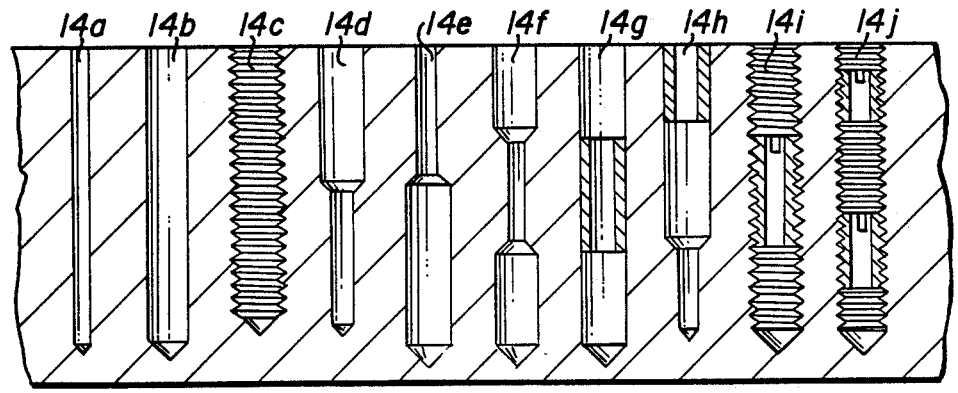
FIG. 5 is a diagrammatic illustration of different forms for the bores in the mold.

FIG. 5 is a diagram illustrating various configurations for the blind bores 14, the bores 14 A and B differ only in diameter while 14C is formed with a deep V thread to increase the surface area and therefore, the heat transfer capability. Bores 14D through F inclusive illustrate different configurations which affect the pattern of heat transfer at different locations on the molded product. 14I and J illustrate movable plugs which again can be adjusted to control the rate of heat transfer at selected areas of the mold.

It will be appreciated by those skilled in this art that the molding machinery to which the present invention is directed are large multi-mold machines for the simultaneous formation of a plurality of molded articles such as glass bottles. When a machine of this type is started up, the vertical bores and the manifold for each mold half are at least partially filled with the desired coolant which is preferably distilled water. The molding process is then initiated and the speed of the machine is adjusted until the desired rate of cooling is accomplished. This is determined by the quality of the molded product and the speed of operation of the machine is increased until the desired quality is reached and further production is then stabilized at that speed. Any problems caused by overfilling of the mold bores and manifolds is automatically taken care of by the bleed valve 26.

While a preferred embodiment has been herein shown and described, applicant claims the benefit of a full range of equivanents with the scope of the appended claims.

I claim:

1. A mold cooling arrangement comprising:

a metallic mold having a plurality of closed vertical bores positioned between the molding surface and the exterior of the mold;

a manifold positioned vertically above said mold and means communicating the interior of said manifold with the upper end of each of said bores;

a vapor condenser communicating with said manifold through a single closed conduit; and positioned vertically thereabove; and means including an adjustable relief valve connected between said condenser and the ambient atmosphere.

2. The method of cooling a mold in order to remove heat from the material being molded and in which the mold includes a plurality of vertical closed bores positioned between the molding surface and the mold exterior comprising:

filling said bores with a vaporizable liquid;

permitting said liquid to partially vaporize in response to heat transfer from the molding material;

conducting said vapors through a single closed conduit to a condenser located vertically above said mold; and permitting the condensed vapor to return to the mold by gravity through said conduit.

3. The combination defined by claim 1 in which said vertical bores are threaded to increase the heat transfer surface area.

4. The combination defined by claim 1 in which said vertical bores are of non-uniform cross-section to provide a preselected pattern of heat transfer.

* * * * *